US012650371B2

(12) United States Patent
Klöfer et al.

(10) Patent No.: US 12,650,371 B2
(45) Date of Patent: Jun. 9, 2026

(54) WINDOW WITH FERROMAGNETIC MARKER FOR A MEASURING ARRANGEMENT, AND MEASURING ARRANGEMENT WITH SUCH A WINDOW

(71) Applicant: Endress+Hauser SE+Co. KG, Maulburg (DE)

(72) Inventors: Peter Klöfer, Steinen (DE); Sergey Lopatin, Lörrach (DE); Anh Tuan Tham, Berlin (DE); Volker Frey, Schopfheim (DE); Benjamin Scherer, Oberried (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 256 days.

(21) Appl. No.: 18/293,398

(22) PCT Filed: Jul. 25, 2022

(86) PCT No.: PCT/EP2022/070739
§ 371 (c)(1),
(2) Date: Jan. 30, 2024

(87) PCT Pub. No.: WO2023/011954
PCT Pub. Date: Feb. 9, 2023

(65) Prior Publication Data
US 2024/0337576 A1 Oct. 10, 2024

(30) Foreign Application Priority Data

Aug. 5, 2021 (DE) ..................... 10 2021 120 432.1

(51) Int. Cl.
*G01N 15/06* (2024.01)
*G01F 15/14* (2006.01)
(Continued)

(52) U.S. Cl.
CPC ....... *G01N 15/0656* (2013.01); *G01F 23/284* (2013.01); *G01L 19/0092* (2013.01); *G01L 19/142* (2013.01); *G01N 2015/0053* (2013.01)

(58) Field of Classification Search
CPC ........ G01F 15/14; G01F 23/02; G01F 23/284; G01F 13/00; G01L 19/0092;
(Continued)

(56) References Cited

U.S. PATENT DOCUMENTS 6,409,925 B1 * 6/2002 Gombinsky ....... G01N 35/1072
436/526
8,421,011 B2 * 4/2013 Melcher ........... B32B 17/10293
250/336.1
(Continued)

FOREIGN PATENT DOCUMENTS

CN 201808255 U 4/2011
DE 10060069 C1 4/2002
(Continued)

*Primary Examiner* — Andre J Allen
(74) *Attorney, Agent, or Firm* — Kelly J. Smith; Endress+Hauser (USA) Holding, Inc.

(57) ABSTRACT

The present disclosure relates to a measuring arrangement comprising a containment for a medium as well as to a measuring device for registering a property of the medium. The containment and/or the measuring device have/has, in each case, at least one apparatus, which apparatus includes a window to a lumen of the containment, wherein the window comprises a dielectric material, such as, for example, a glass or a ceramic, wherein the apparatus includes a ferromagnetic marking, which is adapted in case of a partial failure of the window to shed pieces into the medium, wherein a detector for detecting ferromagnetic materials is provided and adapted to check for presence of marking particles in the medium.

11 Claims, 1 Drawing Sheet

(51) Int. Cl.

| | | |
|---|---|---|
| *G01F 23/02* | (2006.01) | |
| *G01F 23/28* | (2006.01) | |
| *G01F 23/284* | (2006.01) | |
| *G01L 19/00* | (2006.01) | |
| *G01L 19/14* | (2006.01) | |
| *G01N 15/00* | (2024.01) | |

(58) Field of Classification Search
    CPC .................. G01L 19/142; G01N 15/05; G01N
                        2030/8827; G01N 30/6091; G01N
                        15/0656; G01N 2015/0053; G01N
                33/6854; G01N 35/0098; G01N 35/1065;
                    G01N 35/1072; G01N 35/1074; G01N
                                                33/5064
    See application file for complete search history.

(56)                    References Cited

U.S. PATENT DOCUMENTS

| | | | |
|---|---|---|---|
| 10,254,499 B1 * | 4/2019 | Cohen .................... | B33Y 70/10 |
| 10,571,642 B1 * | 2/2020 | Cohen ...................... | B23K 1/20 |
| 2012/0190118 A1 | 7/2012 | Huettel et al. | |
| 2013/0055789 A1 | 3/2013 | Targosz | |
| 2015/0214083 A1 | 7/2015 | Kawakami et al. | |
| 2016/0138992 A1 | 5/2016 | Durrant et al. | |

FOREIGN PATENT DOCUMENTS

| | | | | |
|---|---|---|---|---|
| DE | 102014103378 A1 | 9/2015 | | |
| EP | 3176547 A1 | 6/2017 | | |
| RU | 2017101 C1 | 7/1994 | | |
| WO | WO-2014026907 A1 * | 2/2014 | ............. | G01N 21/15 |

* cited by examiner

Fig. 2)

WINDOW WITH FERROMAGNETIC MARKER FOR A MEASURING ARRANGEMENT, AND MEASURING ARRANGEMENT WITH SUCH A WINDOW

CROSS-REFERENCE TO RELATED APPLICATIONS

The present application is related to and claims the priority benefit of DPMA Patent Application No. 10 2021 120 432.1, filed on Aug. 5, 2021, and International Patent Application No. PCT/EP2022/070739, filed Jul. 25, 2022, the entire contents of which are incorporated herein by reference.

TECHNICAL FIELD

Measuring arrangements for measuring a property of a medium usually have a containment for holding/conveying the medium, as well as at least one measuring device.

BACKGROUND

Media contacting parts of the containment, or of the measuring device, can for practical reasons be made of material having a tendency to shed pieces of itself. Such pieces can be small, such that a partial failure of a part can remain unnoticed.

SUMMARY

An object of the invention is, thus, to provide a window for a measuring arrangement as well as a measuring arrangement, in the case of which such a partial failure can be detected.

The object is achieved by a window and a measuring arrangement as defined in the present disclosure.

A window of the invention is adapted for service in a measuring arrangement comprising a containment for a medium and at least one measuring device for registering a property of the medium, wherein the window is adapted to be applied as a component of the containment or of the measuring device and to form a closure for a lumen of the containment, wherein the window comprises a dielectric material, characterized in that the window includes a ferromagnetic marking, such that the window is adapted in case of a partial failure of the window to shed ferromagnetically marked pieces of itself.

In an embodiment, the marking is formed by a coating of a containment lumen faceable side of the window with a plurality of ferromagnetic marking particles, and/or wherein the dielectric material comprises at least in the region of a containment lumen faceable side a plurality of ferromagnetic marking particles.

In an embodiment, a concentration of the marking particles is defined by a number N per cubic millimeter, wherein at least in a region of an interface between medium and dielectric material N is greater than 100, especially greater than 500, and, preferably, greater than 1000 and/or wherein N is less than 1,000,000, especially less than 50,000, and, preferably, less than 10,000.

In an embodiment, a volume of a marking particle is, in each case, at least 1 cubic micrometer and/or at most 100,000 cubic micrometer.

A measuring arrangement of the invention comprises a containment for a medium as well as a measuring device for registering a property of the medium, wherein the containment and/or the measuring device have/has, in each case, at least one window to a lumen of the containment, wherein the window comprises a dielectric material, such as, for example, a glass or a ceramic, wherein the window includes a ferromagnetic marking, which is adapted in case of a partial failure to shed pieces into the medium, wherein a detector for detecting ferromagnetic materials is provided and adapted to check for presence of marking particles in the medium.

A shed piece producing, partial failure of a component of the measuring arrangement can, thus, be detected in simple manner and a warning report issued.

A containment can be, for example, a tank or a measuring tube or a pipeline.

In an embodiment, the marking is formed by a coating of a containment lumen faceable side of the window with a plurality of ferromagnetic marking particles, and/or wherein the dielectric material comprises at least in the region of a lumen facing interface a plurality of ferromagnetic marking particles.

In an embodiment, a concentration of the marking particles is defined by a number N per cubic millimeter, wherein at least in a region of an interface between medium and dielectric material N is greater than 100, especially greater than 500, and, preferably, greater than 1000 and/or wherein N is less than 1,000,000, especially less than 50,000, and, preferably, less than 10,000.

In this way, it can be assured that a sufficiently great fraction of arising shed pieces contains at least one marking particle, such that a partial failure can be detected early.

In this way, it can be assured that the marking particles cause in the dielectric material an only low influencing of the dielectric material.

In an embodiment, a volume of a marking particle amounts, in each case, to at least 1 cubic micrometer and/or at most 100,000 cubic micrometer.

In this way, a good detectability is provided. The upper limit prevents a disturbing influence of the marking particles, for example, in case of a viewing window.

In an embodiment, the detector is arranged in the region of a drain of the containment.

In this way, the probability that shed pieces are detected is increased.

In an embodiment, the detector is adapted to detect marking particles by establishing a magnetic flux density change.

In an embodiment, the detector comprises, for example:

a quantum magnetometer, a fluxgate magnetometer, a giant magnetoresistance magnetometer.

Quantum magnetometers operate based, for example, on nitrogen vacancy centers in diamonds, whose spectroscopic properties depend on external influences, such as, for example, a present magnetic field. These properties can then be queried, for example, by means of microwave radiation, from which information relative to the external magnetic field can be derived. Such quantum magnetometers have especially high sensitivity and are, consequently, advantageous for detecting such shed pieces.

In an embodiment, the detector is adapted to sense a magnetic field in at least two and, especially, three directions.

In this way, it can be avoided that a shed piece produces a magnetic field directed unfavorably for the detector or distorts a field produced by permanent magnets. A direction dependent measuring can prove useful in the case of asymmetric particles.

In an embodiment, the measuring device is a pressure measuring device having a pressure measuring cell comprising a ceramic material, or a radar fill level measuring device having transmitting/receiving means comprised of a ceramic material, wherein the ceramic material contains the ferromagnetic marking.

In an embodiment, the containment includes a viewing window having a ferromagnetic marking.

BRIEF DESCRIPTION OF THE DRAWINGS

The present disclosure will now be described based on examples of embodiments presented in the appended drawing, the figures of which show as follows:

FIG. 2 shows a schematic, sectional enlargement of an example a window of the present disclosure.

DETAILED DESCRIPTION

Figure 1:
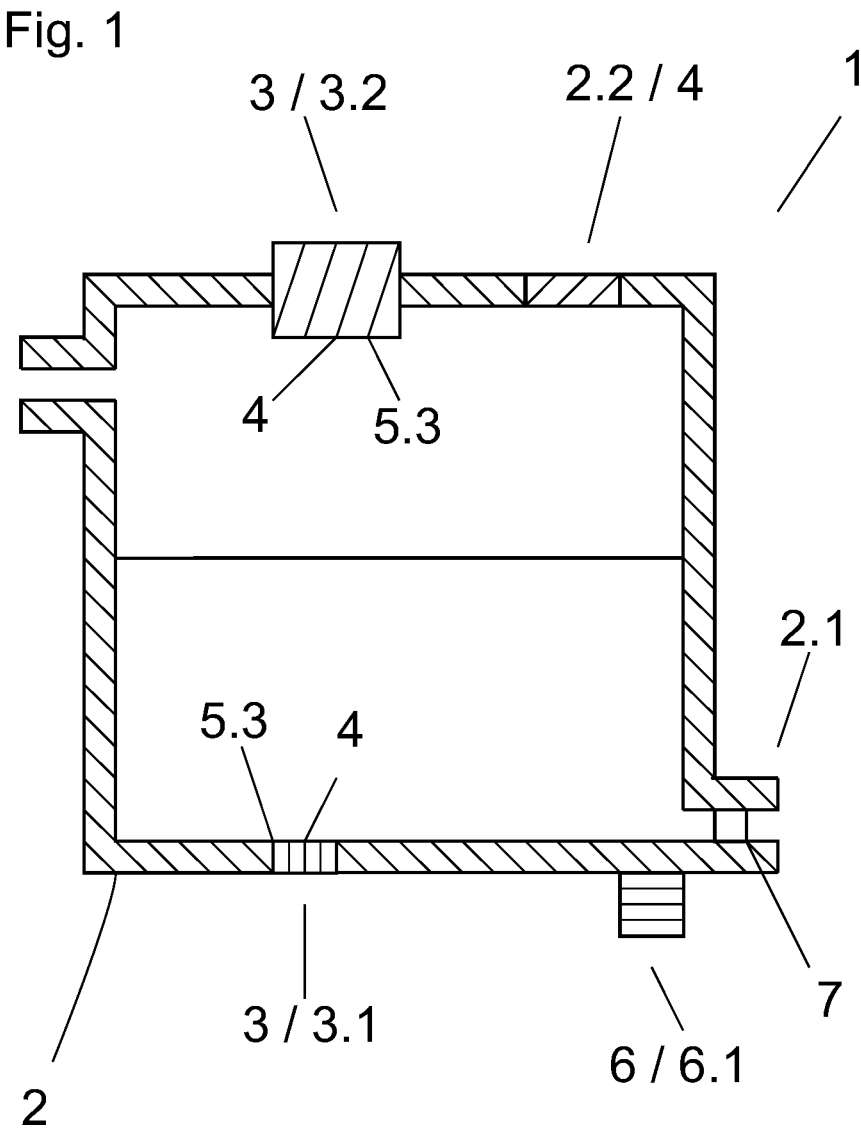
FIG. 1 shows by way of example, a cross section of a measuring arrangement of the present disclosure.
Figure 1:
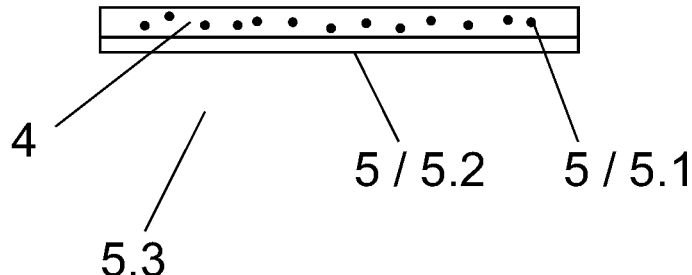

FIG. 1 shows, by way of example, a measuring arrangement 1 of the invention, including a containment 2, in which a medium is located, and measuring devices 3. The containment can, such as shown here, have a supply line, and a drain 2.1, which, such as shown here, can be equipped with a valve 7. The containment can, such as shown here, have a window 4 in the form of a viewing window. As shown here by way of example, a measuring device can be embodied as a pressure measuring device 3.1 or as a contactless, fill level measuring device 3.2. A measuring arrangement of the invention can also have only one measuring device or more than two measuring devices. Measuring devices such as fill level measuring devices or pressure measuring devices usually have a window 4 bordering a lumen of the containment and composed of a dielectric material, such as a glass or a ceramic. Such measuring devices having a window of a dielectric material are susceptible to partial failure, in the case of which shed pieces can arise. For example, the window in case of a pressure measuring device can be in the form of a ceramic diaphragm, whose pressure-dependent deflection is taken into consideration for pressure measurement. Such can be accomplished, for example, by measuring an electrical capacitance between the ceramic diaphragm and an additional component of the pressure measuring device.

According to the invention, at least one such window includes a ferromagnetic marking 5, which is adapted in case of a partial failure of the window to issue ferromagnetically marked, shed pieces into the medium. The marking 5 can be embodied, for example, as a coating 5.2 of the window; compare FIG. 2. Alternatively or supplementally, the window can contain ferromagnetic, marking particles 5.1; compare FIG. 2.

According to the invention, the measuring arrangement includes at least one detector adapted for detecting ferromagnetic marking particles 5.1. In an embodiment, the detector is embodied, for example, in the form of a quantum magnetometer. In case the containment, such as shown here, includes a drain 2.1, the detector is advantageously arranged in the region of the drain, since an increased concentration of shed pieces can be expected there.

Quantum magnetometers operate based, for example, on nitrogen vacancy centers in diamond. The spectroscopic properties of such nitrogen vacancy centers depend on external influences, such as, for example, a present magnetic field. These properties can be queried, for example, by means of microwave radiation, in order to derive information concerning an external magnetic field. Such quantum magnetometers exhibit an especially high sensitivity and are, consequently, advantageous for detecting such shed pieces.

Alternatively, the containment can also be a measuring tube adapted for conveying the medium.

FIG. 2 shows a schematic, sectional enlargement of an example of a window of the invention, wherein the ferromagnetic marking 5 is formed, as shown here by way of example, by the coating 5.2 on a containment lumen faceable side of the window 4 as well as by ferromagnetic marking particles 5.1 contained in the window. The marking 5 can also be formed exclusively by the coating 5.2 or by the marking particles 5.1.

In an embodiment, the ferromagnetic marking particles have a concentration defined by a number N per cubic millimeter, wherein at least in a region of an interface between medium and dielectric material, N is greater than 100, and especially greater than 500, and, preferably, greater than 1000, and/or wherein N is less than 1,000,000, and, especially, less than 50,000, and, preferably, less than 10,000.

The lower limit assures that a sufficiently great part of arising shed pieces contains at least one marking particle, such that a partial failure can be detected early. The upper limit assures that the marking particles bring about in the dielectric material an only minor influencing of the dielectric material.

In an embodiment, volume of a marking particle 5.1 is, in each case, at least 1 cubic micrometer and/or at most 100,000 cubic micrometer.

In this way, it can be assured that the marking particles bring about in the dielectric material an only minor influencing of the dielectric material.

The lower limit assures a sufficient magnetic effect, while the upper limit assures that the marking particles bring about in the dielectric material an only minor influencing of the dielectric material.

LIST OF REFERENCE CHARACTERS 1 measuring arrangement
2 containment
2.1 drain
2.2 viewing window
3 measurement device
3.1 pressure measuring device
3.2 radar fill level measuring device
4 window
5 ferromagnetic marking
5.1 ferromagnetic marking particles
5.2 coating

5.3 containment lumen faceable side of the window

6 detector

6.1 quantum magnetometer

7 valve

The invention claimed is:

1. A window adapted for a measuring arrangement comprising a containment for a medium and at least one measuring device for registering a property of the medium, wherein the window is adapted to be applied as a component of the containment or of the measuring device and to form a closure for a lumen of the containment, wherein the window comprises a dielectric material, wherein the window includes a ferromagnetic marking, such that the window is adapted in case of a partial failure of the window to shed ferromagnetically marked pieces of itself.

2. The window as claimed in claim 1, wherein the marking is formed by a coating of a containment lumen faceable side of the window with a plurality of ferromagnetic marking particles, and/or wherein the dielectric material comprises at least in the region of a containment lumen faceable side a plurality of ferromagnetic marking particles.

3. The window as claimed in claim 2, wherein a concentration of the marking particles is defined by a number N per cubic millimeter, wherein at least in a region of an interface between medium and dielectric material N is greater than 100 and/or wherein N is less than 1,000,000.

4. The window as claimed in claim 1, wherein a volume of a marking particle is, in each case, at least 1 cubic micrometer and/or at most 100,000 cubic micrometer.

5. A measuring arrangement comprising a containment for a medium as well as a measuring device for registering a property of the medium, wherein the containment and/or the measuring device have/has, in each case, at least one window as claimed in one of the preceding claims to a lumen of the containment, wherein the window comprises a dielectric material, such as, for example, a glass or a ceramic, wherein the window includes a ferromagnetic marking, which is adapted in case of a partial failure of the window to shed ferromagnetically marked pieces into the medium.

6. The measuring arrangement as claimed in claim 5, wherein a detector for detecting ferromagnetic materials is provided and adapted to check for presence of marking particles in the medium, wherein the detector is arranged in the region of a drain of the containment.

7. The measuring arrangement as claimed in claim 6, wherein the detector is adapted to detect marking particles by establishing a magnetic flux density change.

8. The measuring arrangement as claimed in claim 7, wherein the detector comprises:

a quantum magnetometer based on nitrogen vacancy centers in diamond, a fluxgate magnetometer, a giant magnetoresistance magnetometer.

9. The measuring arrangement as claimed in claim 6, wherein the detector is adapted to sense a magnetic field in at least two directions.

10. The measuring arrangement as claimed in claim 5, wherein the measuring device is a pressure measuring device having a pressure measuring cell comprising a ceramic material or a radar fill level measuring device having transmitting/receiving means comprised of a ceramic material, wherein the ceramic material contains the ferromagnetic marking.

11. The measuring arrangement as claimed in claim 5, wherein the window is a viewing window.

* * * * *